March 10, 1959  H. G. ZIMMERMAN ET AL  2,876,634
THERMODYNAMIC CONTAINER
Filed Dec. 8, 1954
FIG_1
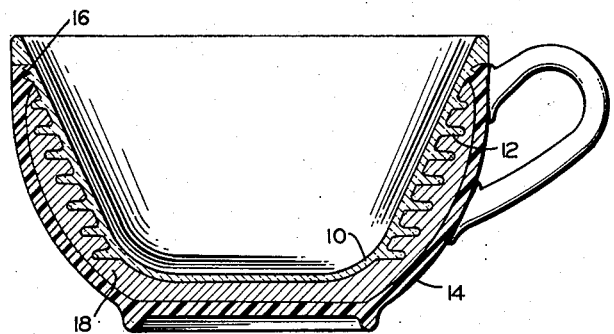
FIG_2
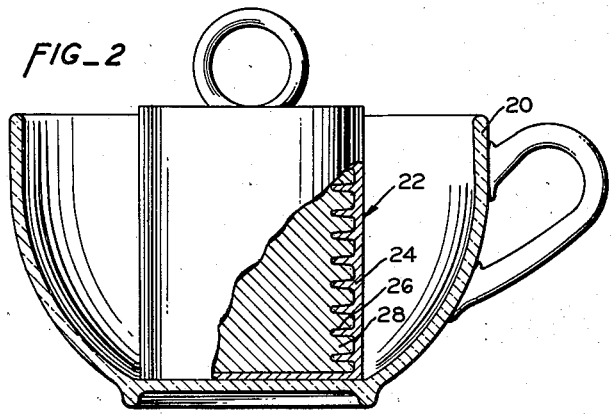
FIG_3
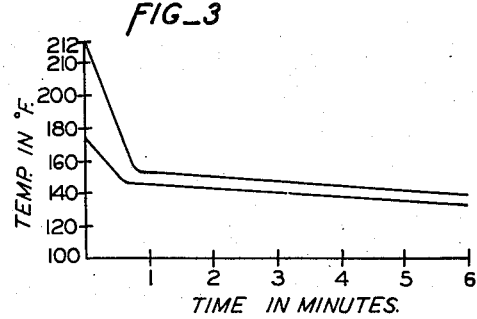
TIME IN MINUTES.
INVENTORS
HALE G. ZIMMERMAN
JAMES W. WELSH
BY Naylor and Lasagne
ATTORNEYS United States Patent Office 2,876,634
Patented Mar. 10, 1959

2,876,634

THERMODYNAMIC CONTAINER

Hale G. Zimmerman, Mountain View, and
James W. Welsh, Santa Clara, Calif.

Application December 8, 1954, Serial No. 473,953

1 Claim. (Cl. 62—457)

This invention relates to material containers, and more particularly to a container for materials, such as foods and beverages, adapted to control the temperature thereof.

An object of the invention is to provide a container embodying means for effecting a rapid cooling of heated materials to the point where they are at a satisfactory temperature for use and for thereafter tending to maintain said materials at said temperature.

A further object of the invention is to provide a container embodying means adapted to serve both as a heat storage battery and a thermal governor with respect to the material contained therein.

Broadly, this invention comprises the following three elements in combination: an innermost material container having good heat transfer properties; an outermost sheath disposed in laterally enveloping relation to said container and having poor heat transfer properties; and a solid material disposed between said container and sheath hand selected to have a melting point at a temperature approximating the desired temperature for use of a material disposed within said container.

Other objects and advantages of the invention will be apparent from the following description taken in conjunction with the drawing forming part of this specification, and in which:

Figure 1 is a view in vertical diametral section of a cup embodying the subject invention;

Figure 2 is a view in vertical diametral section of a cup containing therein a separate temperature control means for liquids, said means consistuting a modified form of the invention; and Figure 3 is a time verus temperature graph illustrating the function and mode of operation of the subject invention.

With reference to Figure 1, the form of the invention shown comprises an innermost container 10 formed of a material, such as glass or ceramic, having good heat transfer properties and provided with a plurality of fins 12, an outermost container 14 formed of a material, such as hard rubber, or plastic, having good heat insulation properties, secured to container 10, as for example by a threaded connection 16, and thermodynamic material 18 disposed between container 10 and container 14 and selected to have a solid to liquid or liquid to gas change of state temperature within the range of the desired temperature for use of a heated material to be disposed in and dispensed from container 10.

While the subject invention is adapted to be used with a wide variety of materials, it has perhaps its greatest utility when it is used as a container for edible materials, such as foods and beverages, which normally and prior to consumption are at a temperature too high for immediate consumption. The thermodynamic container of Figure 1 will therefore, for purposes of example only, be described as being used as a coffee cup.

It is of course well known that coffee quite frequently is served at a temperature at which it is too hot for immediate drinking. In fact the coffee may be so hot as to require a number of minutes for it to cool to the desired drinking temperature range of approximately 145–155° F. The container of Figure 1 is adapted to cool the coffee down from even the boiling temperature to said desired range in less than one minute's time and to thereafter maintain the temperature within the desired range for a period of many minutes. For this purpose, the preferred material 18 is bee's wax, having a melting point of approximately 147° F.

With reference to Figure 3 which graphically illustrates the temperature—time effect of the container on coffee, it will be seen that the coffee is rapidly cooled from its upper temperature range to the desired temperature range for use, and that thereafter the coffee cools at a much slower rate than would be the case were it in a conventional coffee cup. It will be further noted from Figure 3 that the temperature of the coffee upon being put in the container may vary over a 40° range, i. e. 170° F. to 212° F., and that, no matter what the starting temperature within this range is, the coffee will be cooled within substantially the same amount of time to a temperature within approximately a 10° range, i. e. 145° F. to 155° F. This thermal governor effect is due to the fact that a change of state material is employed in the container.

Heat from the coffee is transferred rapidly through the inner container 10 and its heat transfer fins 12 to the bee's wax 18, said container 10 and bee's wax 18 jointly having the capacity of absorbing something less than one calorie of heat per gram of weight per one degree centrigrade rise in temperature. The wax is thus rapidly heated to its melting point of approximately 147° F., at which point the wax requires approximately 45 calories additional heat per gram to melt it. The amount of wax is such, in relation to the maximum amount of heat to be absorbed from the maximum volume of coffee within container 10 to bring the coffee to the desired temperature range, that the wax becomes fully melted but does not reach a temperature more than a few degrees above its melting temperature. Hence, at or near 147° F. a temperature equilibrium is established between the coffee, container 10 and wax, marking the end of the rapid cooling of the coffee. From this point on, the rate of cooling of the coffee is primarily governed by the rate of transfer of heat from the wax through the outer container 14, with of course some radiation and convection losses to atmosphere from the surface of the coffee.

A further modification of the invention is shown in Figure 2. Here, a conventional cup 20 has disposed therein a thermodynamic cartridge 22 comprising a cylindrical container 24 formed of material having good heat transfer properties and provided with internal fins 26 and filler material 28, such as the aforementioned bee's wax.

The heat from the coffee passes through the container 24 and into the wax 28 which, similar to the wax 18 in the preferred embodiment of the invention shown in Figure 1, serves as both a heat storage battery and a thermal governor. The conventional cup 20 has the conventional characteristic of transmitting the heat from the coffee to atmosphere fairly rapidly, and so the embodiment of the invention shown in Figure 1 is more desirable from the standpoint of preserving the temperature of the coffee within the desired range for as long as possible.

It will be obvious that the invention may be embodied in soup bowls, baby bottles, infants' feeding dishes, platters, and the like, as well as in other environments, such as bath tubs, and the like.

What is claimed is:

A device adapted to rapidly cool coffee, and other potable and edible materials, from a temperature within the range of approximately 170–212° F. to a temperature within the range of 145–155° F. and to maintain said coffee at a temperature within said latter range for a relatively long period of time comprising an outer container formed of material having good heat insulator properties, an inner container formed of material having good heat transfer properties, said containers being mutually secured together adjacent their upper edges and defining therebetween a sealed space, and bee's wax disposed within said sealed space in sufficient amount to ensure a complete change of state thereof during the course of the lowering of the temperature of coffee disposed within said inner container from said first-mentioned range to said second-mentioned range.

References Cited in the file of this patent

UNITED STATES PATENTS

| | | |
|---|---|---|
| 283,165 | Taddicken | Aug. 14, 1883 |
| 848,228 | Ettel | Mar. 26, 1907 |
| 1,721,311 | Muenchen | July 16, 1929 |
| 1,978,176 | Steenstrup | Oct. 23, 1934 |
| 2,191,198 | Gould | Feb. 20, 1940 |
| 2,526,165 | Smith | Oct. 17, 1950 |
| 2,622,415 | Landers et al. | Dec. 23, 1952 |
| 2,688,467 | Leatzow | Sept. 7, 1954 |